US008878095B2

(12) United States Patent
Li et al.

(10) Patent No.: US 8,878,095 B2
(45) Date of Patent: Nov. 4, 2014

(54) REDUCING BACK-REFLECTION IN LASER MICROMACHINING SYSTEMS

(75) Inventors: Guangyu Li, Portland, OR (US);
Mehmet E. Alpay, Portland, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 490 days.

(21) Appl. No.: 12/972,021

(22) Filed: Dec. 17, 2010

(65) Prior Publication Data

US 2012/0152918 A1 Jun. 21, 2012

(51) Int. Cl.
*B23K 26/06* (2014.01)
*B23K 26/08* (2014.01)
*H01S 3/00* (2006.01)

(52) U.S. Cl.
CPC ........... *B23K 26/0656* (2013.01); *H01S 3/0064* (2013.01)
USPC ................................. 219/121.75; 219/121.78

(58) Field of Classification Search
USPC ................. 219/121.6, 121.61, 121.73–121.8; 359/641, 642, 643
See application file for complete search history.

(56) References Cited

U.S. PATENT DOCUMENTS

| | | | |
|---|---|---|---|
| 4,676,592 A | 6/1987 | Nishioka et al. | |
| 5,548,608 A | 8/1996 | Zhang | |
| 5,670,069 A * | 9/1997 | Nakai et al. | 219/121.73 |
| 5,796,880 A | 8/1998 | Ford et al. | |
| 5,815,278 A | 9/1998 | Johnston et al. | |
| 6,088,153 A | 7/2000 | Anthon et al. | |
| 6,292,604 B1 | 9/2001 | Cheng | |
| 6,696,667 B1 * | 2/2004 | Flanagan | 219/121.72 |
| 6,792,193 B2 | 9/2004 | Maestle et al. | |
| 6,853,652 B2 | 2/2005 | Lee et al. | |
| 7,067,763 B2 | 6/2006 | Schramm | |
| 7,149,383 B2 | 12/2006 | Chen | |
| 7,433,027 B2 | 10/2008 | Hall | |
| 7,518,086 B2 | 4/2009 | Norikane et al. | |
| 7,563,695 B2 * | 7/2009 | Gu et al. | 438/463 |
| 7,843,633 B2 * | 11/2010 | Nakamae et al. | 359/362 |
| 7,887,712 B2 * | 2/2011 | Boyle et al. | 216/65 |
| 2002/0076178 A1 | 6/2002 | Klocek et al. | |
| 2004/0074881 A1 * | 4/2004 | Oishi | 219/121.63 |
| 2004/0223692 A1 | 11/2004 | Tallone et al. | |
| 2007/0139651 A1 | 6/2007 | Courville | |
| 2008/0170291 A1 | 7/2008 | Nakamae et al. | |
| 2008/0272096 A1 | 11/2008 | Alpay et al. | |
| 2009/0173723 A1 * | 7/2009 | Nakagawa et al. | 219/121.71 |
| 2009/0308852 A1 | 12/2009 | Alpay et al. | |

OTHER PUBLICATIONS

Notification of Transmittal of The International Search Report and the Written Opinion of the International Searching Authority, or the Declaration dated Jan. 12, 2010, for PCT/US2009/047490, filing date Jun. 16, 2009.
Office Action mailed Sep. 28, 2011, for U.S. Appl. No. 12/209,959, filed Sep. 12, 2008.
Notice of Allowance and Fee(s) Due mailed Mar. 19, 2012, for U.S. Appl. No. 12/209,959, filed Sep. 12, 2008.
Notification of Transmittal of the International Search Report and the Written Opinion of the International Searching Authority, or the Declaration, for application PCT/US2011/064959, International Filing Date Dec. 14, 2011.

* cited by examiner

*Primary Examiner* — Sang Y Paik
(74) *Attorney, Agent, or Firm* — Stoel Rives LLP

(57) ABSTRACT

Systems and methods reduce or prevent back-reflections in a laser processing system. A system includes a laser source to generate an incident laser beam, a laser beam output to direct the incident laser beam toward a work surface along a beam path, and a spatial filter. The system further includes a beam expander to expand a diameter of the incident laser beam received through the spatial filter, and a scan lens to focus the expanded incident laser beam at a target location on a work surface. A reflected laser beam from the work surface returns through the scan lens to the beam expander, which reduces a diameter of the reflected beam and increases a divergence angle of the reflected laser beam. The spatial filter blocks a portion of the diverging reflected laser beam from passing through the aperture and returning to the laser beam output.

10 Claims, 10 Drawing Sheets

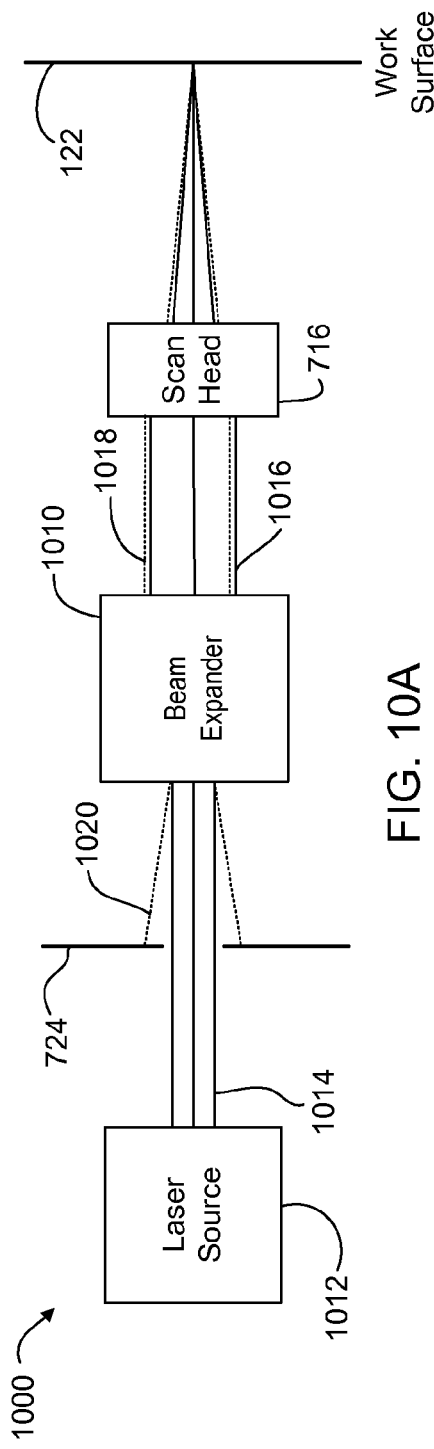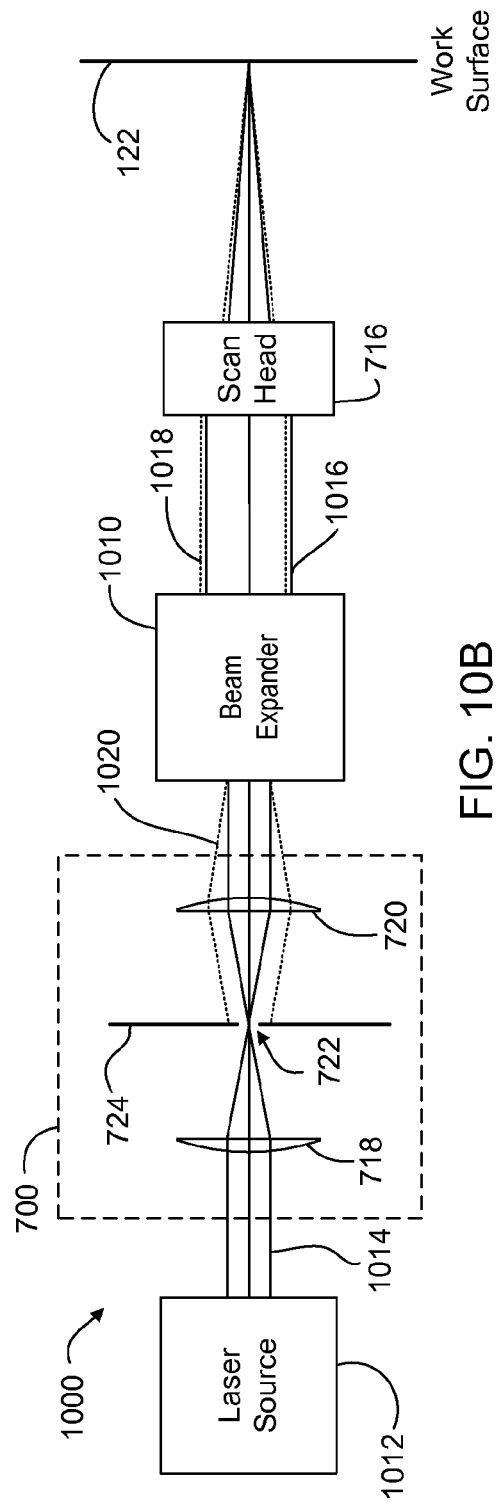

REDUCING BACK-REFLECTION IN LASER MICROMACHINING SYSTEMS

TECHNICAL FIELD

This disclosure relates to processing materials with lasers. In particular, this disclosure relates to reducing laser beam back-reflection.

BACKGROUND INFORMATION

Generally, certain lasers may be sensitive to optical feedback from a laser beam reflected back to the laser from a work surface. Laser back-reflection may cause laser instability or damage to certain types of lasers. For example, fiber lasers are typically very sensitive to back-reflections from a work surface. If such reflections are not properly blocked, e.g., if there is a return path for such reflections to couple back into an output fiber, it is possible that both the output fiber and gain fibers may be damaged. Further, a seed laser may be damaged in a high-power master oscillator fiber amplifier device by reflected light that is amplified on its way back to the seed laser. In many laser processing systems, such as laser micromachining systems, it is therefore desirable to prevent such back-reflections from finding a path back into the output fiber.

One solution for reducing or avoiding back-reflection in laser processing systems is to use a Faraday isolator, such as the isolators manufactured by Electro-Optics Technology, Inc. of Traverse City, Mich. Placing a Faraday isolator in the beam path after the laser source or output fiber blocks the back-reflections in free-space before the back-reflections return to the laser source or output fiber.

For example, FIG. 1A is a block diagram of a typical laser system 101 including a laser source 102, an isolator 104, a beam delivery subsystem 106, and a scan head 108. The laser source 102 outputs a laser beam 103 received by the isolator 104. The isolator 104 allows the laser beam 103 to propagate in only one direction (e.g., as indicated by the arrow) through the beam delivery subsystem 106 and the scan head 108 to a desired location on a work surface 122. Thus, the isolator 104 blocks back-reflections from the work surface 122 through the scan head 108 and beam delivery subsystem 106 so as to prevent the back-reflections from reaching the laser source 102.

For a linearly polarized laser system, the isolator 104 may be a polarization dependent isolator that includes an input polarizer (not shown), a Faraday rotator (not shown), and an output polarizer (not shown). Although shown following the laser source 102, the isolator 104 may be located at other locations along the beam path such as in the scan head 108 or within the beam delivery subsystem 106 (which may include, e.g., galvanometers, steering mirrors, lenses, and other optical elements).

For a randomly polarized laser system, a polarization independent optical isolator may be used to prevent or reduce back-reflections. For example, FIG. 1B is a block diagram of a typical fiber laser processing system 100 that includes an output fiber 110, a collimator assembly 112, a Faraday isolator 114, and a focusing lens 116. The output fiber 110 directs a divergent laser beam 118 from a laser source (not shown) to the collimator assembly 112. The collimator assembly 112 collimates the divergent laser beam 118 to provide a collimated laser beam 120 to the Faraday isolator 114.

The Faraday isolator 114 allows the transmission of light in only one direction. The collimated laser beam 120 transmits through the Faraday isolator 114 to the focusing lens 116, which focuses the beam onto a work surface 122. Because the incident laser beam's path is perpendicular to the work surface 122, a reflected laser beam 123 (shown in dashed lines) travels along the same path as that of the incident laser beam 120, in the reverse direction, through the focusing lens 116 to the Faraday isolator 114. The Faraday isolator 114, however, prevents the reflected laser beam from continuing along the reverse path back to the output fiber 110.

If the laser beam 118 exiting the output fiber 110 is randomly polarized (as it often is), the Faraday isolator 114 is configured to be polarization insensitive. As shown in FIG. 1B, for example, a polarization insensitive Faraday isolator 114 may include an input birefringent wedge 124, a Faraday rotator 126, and an output birefringent wedge 128. While such isolators are commercially available, they are usually quite bulky (especially when configured for use with high-power beams), expensive, and add complexity to system alignment. Optical isolators may also be subject to thermal lensing effects in high power applications.

Another approach to reduce or avoid back-reflections is to "tilt" the entire beam delivery subsystem with respect to the work surface 122 so that the angle of incidence of the beam hitting the work surface is not 90 degrees. For example, FIG. 2 is a block diagram of another typical fiber laser processing system 200 having a tilted beam delivery subsystem (e.g., the output fiber 110, the collimator assembly 112, and the focusing lens 116) such that the path of the incident laser beam 120 is non-perpendicular to the work surface 122.

As a consequence of tilting the beam delivery subsystem, the path of the reflected laser beam 123 from the work surface 122 is angularly separated from the path of the incident laser beam 120. A portion 210 of the reflected laser beam 123 may propagate back through the focusing lens 116 to the output fiber 110. However, the angular separation between the path of the incident laser beam 120 and the reflected laser beam 123 corresponds to a spatial separation which, in turn, substantially prevents the back-reflected beam 123 from coupling into the output fiber 110. The amount of spatial separation between the paths of the incident laser beam 120 and the reflected laser beam 123 is proportional to the focal length of the focusing lens 116 and the angular tilt (with respect to the work surface 122) of the beam delivery subsystem. Thus, the amount of spatial separation may be increased by increasing either the focal length, the angular tilt, or both the focal length and the angular tilt.

As discussed below, while tilting the entire beam delivery subsystem with respect to the work surface 122 reduces back-reflections, it also tilts the focal plane with respect to the work surface 122. This leads to variations in the spot size and fluence at the work surface 122. These variations deteriorate process performance.

SUMMARY OF THE DISCLOSURE

Disclosed systems and methods reduce or prevent back-reflections in a laser processing system. In one embodiment, a system includes a laser source to generate an incident laser beam, a laser beam output to direct the incident laser beam toward a work surface along a beam path, and a spatial filter. The system further includes a beam expander to expand a diameter of the incident laser beam received through the spatial filter, and a scan lens to focus the expanded incident laser beam at a target location on a work surface. A reflected laser beam from the work surface returns through the scan lens to the beam expander, which reduces a diameter of the reflected beam and increases a divergence angle of the reflected laser beam. The spatial filter blocks a portion of the diverging reflected laser beam from passing through the aperture and returning to the laser beam output.

In addition, or in another embodiment, the system may include focusing optics to focus the incident laser beam at an internal focus location along the beam path. The aperture of the spatial filter is located at the focus location. The focusing optics may comprise a Keplerian telescope.

In addition, or in another embodiment, the system may include an f-theta lens. A central portion of a scan field of the f-theta lens may be designated as a dead zone of a predetermined size that is not used for laser processing of the work surface at the target location.

In addition, or in another embodiment, the system may include a secondary beam positioner located between the laser beam output and the scan lens to scan the incident laser beam across the f-theta lens. The secondary beam positioner may change the path of the incident laser beam from a first position to a second position with respect to the scan lens. The secondary beam positioner may also control a scan angle of the incident laser beam at the scan lens so as to avoid the dead zone.

In another embodiment, a method includes generating, with a laser, an incident laser beam, propagating the incident laser beam along a beam path toward a work surface, and expanding the incident laser beam from a first diameter to a second diameter along the beam path to achieve a smaller spot size at the work surface. The expansion results in decreasing the divergence of the incident laser beam. The method further includes receiving a reflected laser beam from the work surface in a reverse direction along the beam path, and reducing a size of the reflected laser beam from the second diameter to the first diameter. The reduction results in increasing the divergence angle and pointing angle of the reflected laser beam. The method further includes spatially filtering the diverging reflected laser beam to block at least a portion thereof from returning to the laser.

Additional aspects and advantages will be apparent from the following detailed description of preferred embodiments, which proceeds with reference to the accompanying drawings.

BRIEF DESCRIPTION OF THE DRAWINGS

Non-limiting and non-exhaustive embodiments of the disclosure are described, including various embodiments of the disclosure with reference to the figures, in which:

FIGS. 10A and 10B are block diagrams of laser processing systems including a beam expander used with a spatial filter to reduce or avoid back-reflections according to certain embodiments.

DETAILED DESCRIPTION OF PREFERRED EMBODIMENTS

Figure 1A:
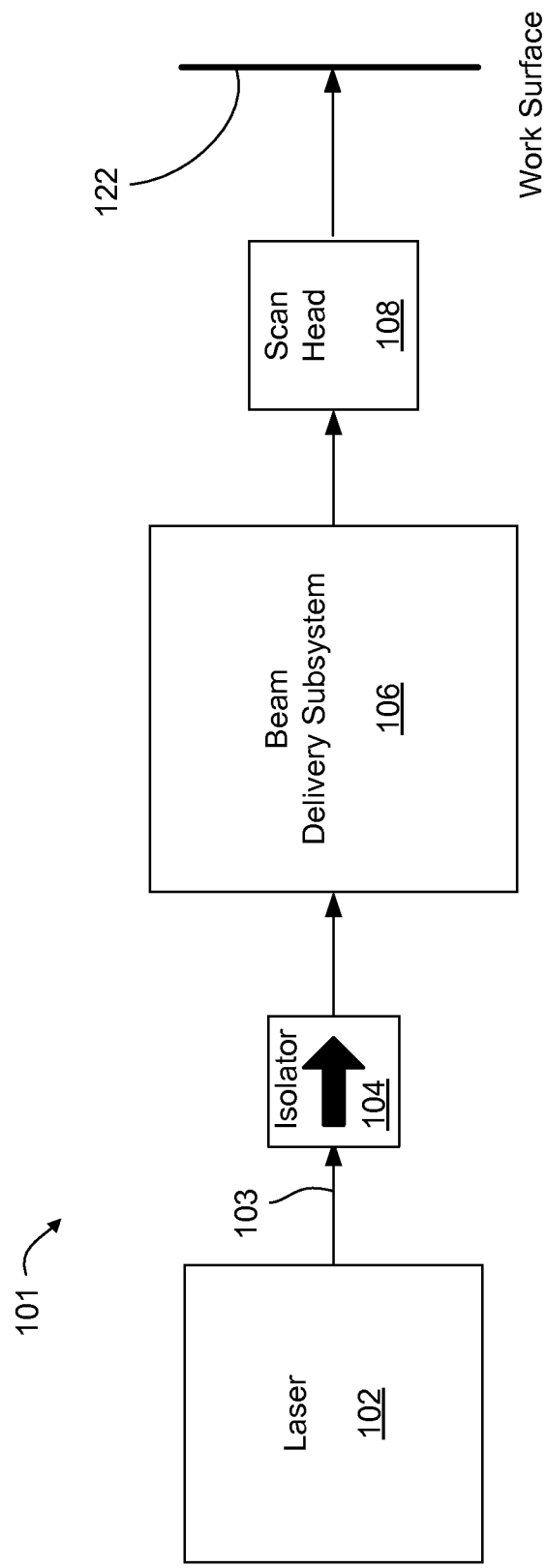
FIG. 1A is a block diagram of a typical laser system.

Various systems and methods described herein reduce or prevent back-reflections from coupling into an output fiber of a laser processing system without using bulky and/or expensive isolators. In one embodiment, a focusing lens is placed in the beam path at an offset distance from the beam propagation axis so as to impart a non-vertical "angle-of-attack" to the incident beam with respect to the work surface. This provides a spatial separation between incident and reflected beam paths without tilting the entire beam delivery subsystem with respect to the work surface. In one embodiment, an aperture further blocks the back-reflected laser beam from reaching the output fiber. In addition, or in another embodiment, a secondary beam positioner scans an incident laser beam across the focusing lens at an offset from the focusing lens's primary axis such that a scanning focal plane is substantially parallel to the work surface.

Other embodiments disclosed herein effectively reduce back-reflections with low cost configurations. These embodiments include using a Keplerian telescope with a spatial filter at the internal focus, using predetermined portions of a scanning field of an f-theta lens, using a beam expander with a spatial filter, and/or combinations of the foregoing. Depending on the system configuration and the surface quality of the parts to be processed, these embodiments can effectively reduce or prevent back-reflection problems.

Reference is now made to the figures in which like reference numerals refer to like elements. In the following description, numerous specific details are provided for a thorough understanding of the embodiments described herein. However, those skilled in the art will recognize that the embodiments can be practiced without one or more of the specific details, or with other methods, components, or materials. Further, in some cases, well-known structures, materials, or operations are not shown or described in detail in order to avoid obscuring aspects of the embodiments. Furthermore, the described features, structures, or characteristics may be combined in any suitable manner in one or more embodiments.

Figure 2:
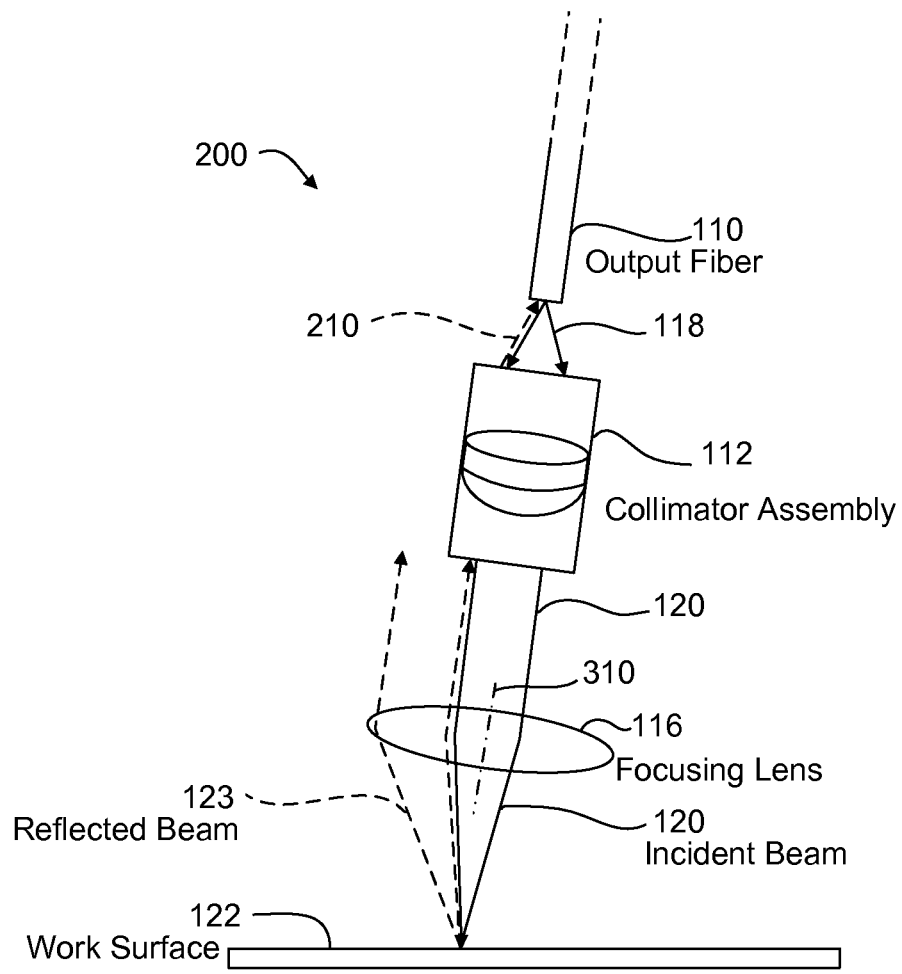
FIG. 2 is a block diagram of another typical fiber laser processing system having a tilted beam delivery subsystem to reduce back-reflections.
Figure 3:
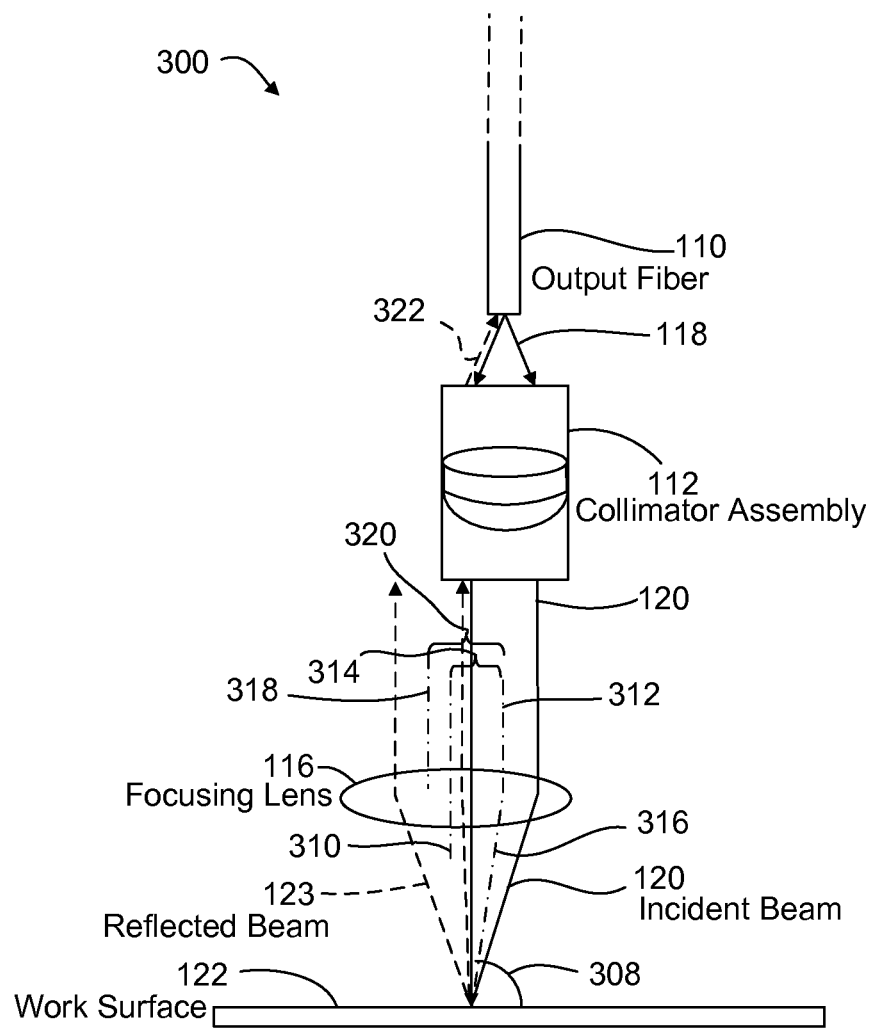
FIG. 3 is a block diagram of a laser processing system that reduces or substantially prevents back-reflections according to one embodiment.

FIG. 3 is a block diagram of a laser processing system 300 that reduces or substantially prevents back-reflections according to one embodiment. The system 300 creates a spatial separation between the paths of an incident laser beam 120 and a reflected laser beam 123 (shown in dashed lines) by providing the incident laser beam 120 on a work surface 122 at an angle 308 other than 90 degrees. This change in the incident beam's "angle of attack" 308 is not, however, achieved by tilting the beam delivery assembly, as discussed above with respect to FIG. 2.

The system 300 includes a fiber laser source (not shown) having an output fiber 110. In the examples described herein, fiber-based lasers are discussed because such lasers are sensitive to back-reflections. An artisan will recognize from the disclosure herein, however, that other types of lasers may also be sensitive to back-reflections and that any type of laser source may be used. Accordingly, other types of lasers may have laser beam outputs other than the output fiber 110 discussed herein. Indeed, a laser beam output may include a combination of various optical elements used to guide a laser beam's path before the beam is focused onto a work surface 122.

The system 300 shown in FIG. 3 further includes a collimator assembly 112 and a focusing lens 116. The output fiber 110 directs a divergent laser beam 118 to the collimator assembly 112. The collimator assembly 112 collimates the divergent laser beam 118 such that the incident laser beam 120 on the focusing lens 116 is substantially collimated. The focusing lens 116 is a converging lens and is substantially symmetrical about its primary axis 310. The primary axis 310 of the focusing lens 116 is substantially perpendicular to the work surface 122.

Figure 1B:
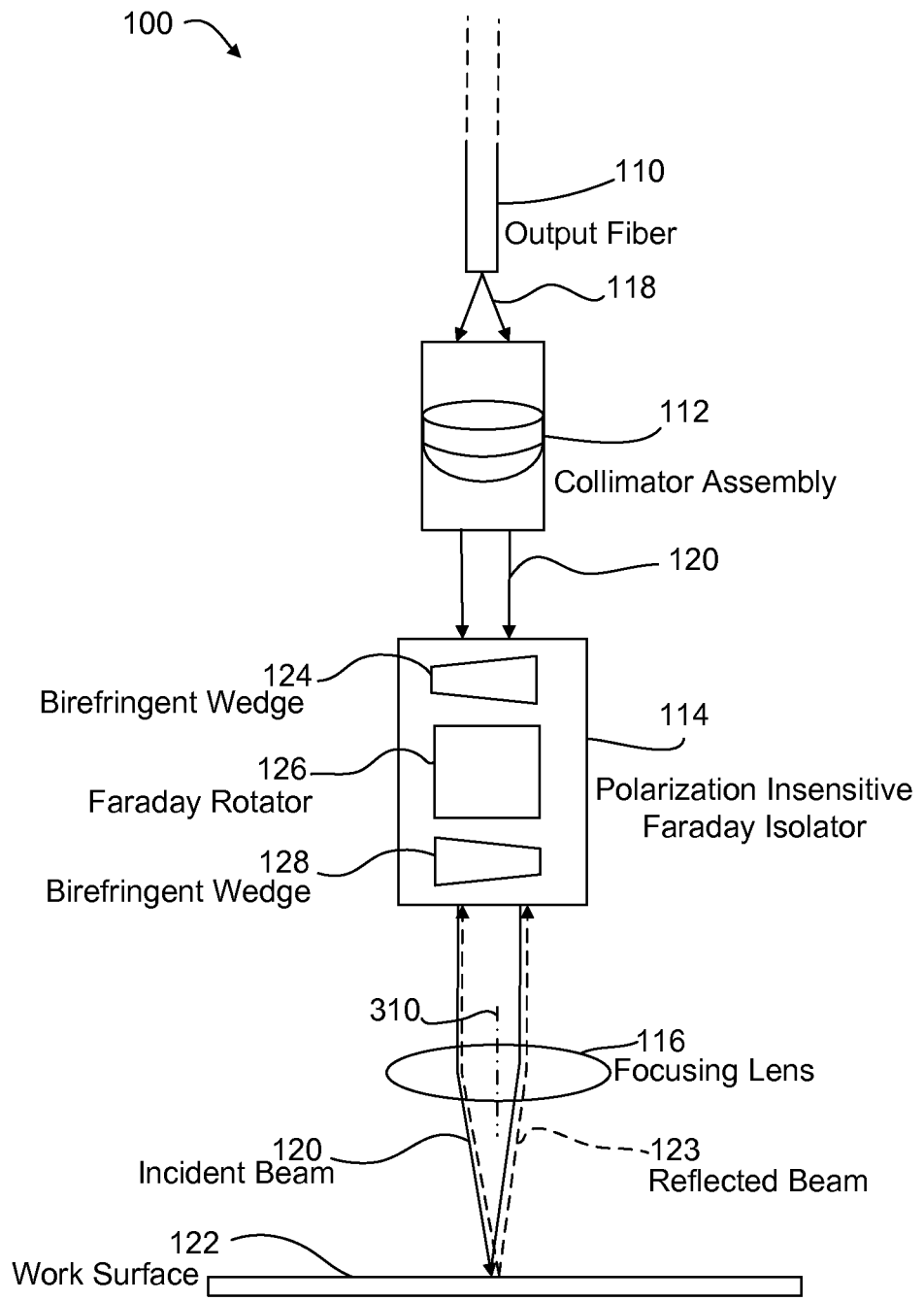
FIG. 1B is a block diagram of a typical fiber laser processing system that includes a Faraday isolator to reduce back-reflections.

The incident laser beam 120 propagates along a first axis of propagation 312 from the collimator assembly 112 to the focusing lens 116. The first axis of propagation 312 is substantially parallel to the primary axis 310 of the focusing lens 116. There is, however, an offset 314 between the first axis of propagation 312 of the incident laser beam 120 and the primary axis 310 of the focusing lens 116. In other words, the (collimated) incident laser beam 120 does not hit the focusing lens 116 at the center of the lens 116 (as in the standard layouts shown in FIGS. 1B and 2). Rather, the incident laser beam 120 hits the focusing lens 116 at an offset 314 from the center of the lens 116. In one embodiment, the amount of offset 314 is greater than or equal to approximately one-half the diameter of the collimated incident laser beam 120. As discussed below, such an amount of offset 314 reduces or prevents overlap between the reflected laser beam 123 and the incident laser beam 120.

The focusing lens 116 converges the incident laser beam 120 to a focused spot diameter on the work surface 122. As a result of the asymetric arrangement provided by the offset 314 between the first axis of propagation 312 of the incident laser beam 120 and the primary axis 310 of the focusing lens 116, the focusing lens 116 "tilts" the incident laser beam 120 toward the primary axis 310 of the focusing lens 116. Thus, the focusing lens 116 changes the incident laser beam's path from the first axis of propagation 312 to a second axis of propagation 316 that intersects the work surface 122 at a non-perpendicular angle of attack 308.

As a consequence of using the offset 314 to tilt the incident laser beam 120, the path of the reflected laser beam 123 is angularly separated from the path of the incident laser beam 120. Thus, after returning through the focusing lens 116, the reflected laser beam 123 travels along a third axis of propagation 318 that is spatially separated from the first axis of propagation 312 of the incident laser beam 120. In certain embodiments, an offset 320 between the first axis of propagation 312 corresponding to the incident laser beam 120 and the third axis of propagation 318 corresponding to the reflected laser beam 123 is configured such that the reflected laser beam 123 does not overlap with the incident laser beam 120. Thus, all or at least a substantial portion of the reflected laser beam 123 does not return through the collimator assembly 112 to the output fiber 110.

As shown in FIG. 3, there may be situations in which a small portion 322 of the reflected laser beam 123 couples back into the output fiber 110. This may be undesirable in some embodiments. Thus, in certain such embodiments, a beam-stop is located anywhere between the output fiber 110 and the work surface 122 to prevent the remaining portion 322 of the reflected laser beam 123 from returning to the output fiber 110.

Figure 4:
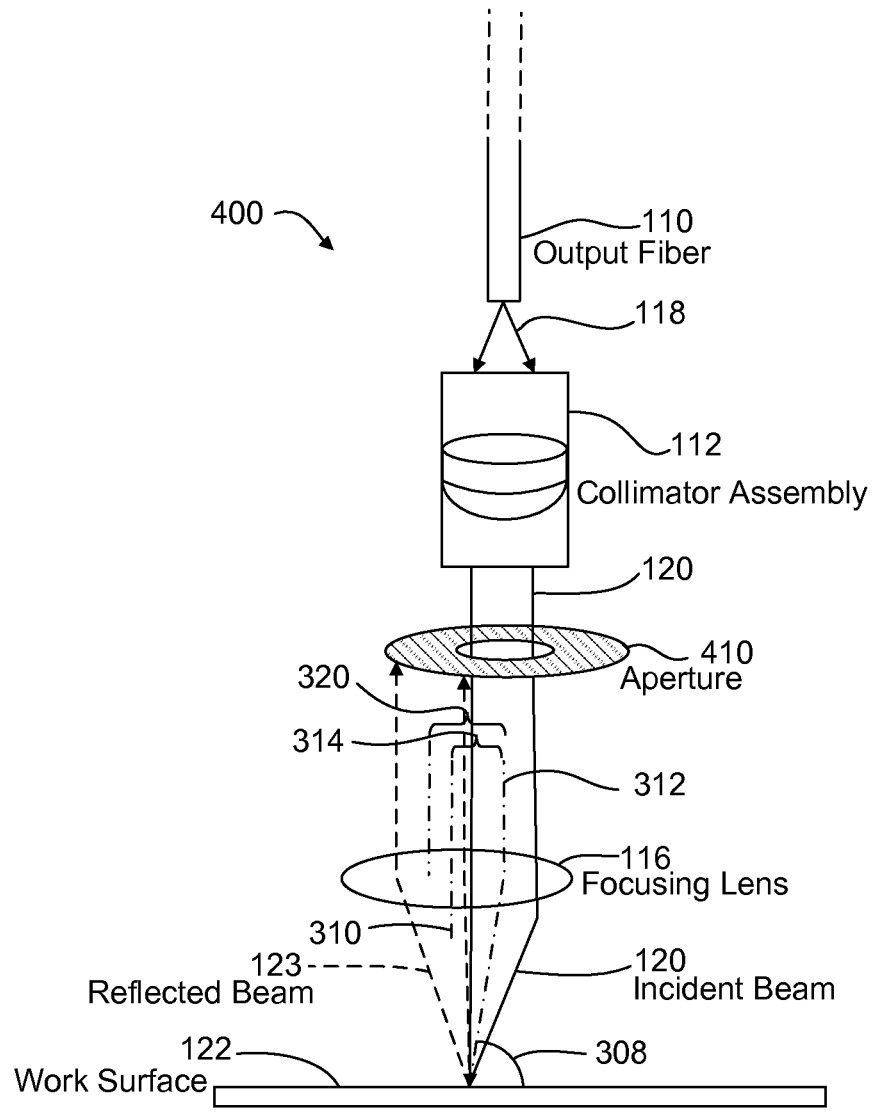
FIG. 4 is a block diagram of a laser processing system that includes an aperture that allows propagation of an incident laser beam and blocks the propagation of a reflected laser beam according to one embodiment.

Other devices may also be used as a beam-stop. For example, FIG. 4 is a block diagram of a laser processing system 400 that includes an aperture 410 that allows propagation of the incident laser beam 120 and blocks the propagation of the reflected laser beam 123 according to one embodiment. The aperture 410 has an opening that is substantially centered about the first axis of propagation of the incident laser beam 120. In one embodiment, the aperture 410 is greater than or substantially equal to the diameter of the (collimated) incident laser beam 120 so as to allow the incident laser beam 120 to pass from the collimator assembly 112 to the focusing lens 116.

In one embodiment, the system 400 is configured such that the spatial separation 320 between the paths of the incident laser beam 120 and the reflected laser beam 123 (as determined by the focal length of the focusing lens 116 and the amount of offset 314 between the first axis of propagation 312 of the incident laser beam 120 and the primary axis 310 of the focusing lens 116) is in a range between approximately 1.5 times and 2.0 times the diameter of the collimated incident laser beam 120. Thus, by selecting the aperture 410 such that it has a comparable opening diameter to that of the incident laser beam 120, the likelihood of any significant back-reflections propagating to the output fiber 110 is substantially reduced.

Figure 5:
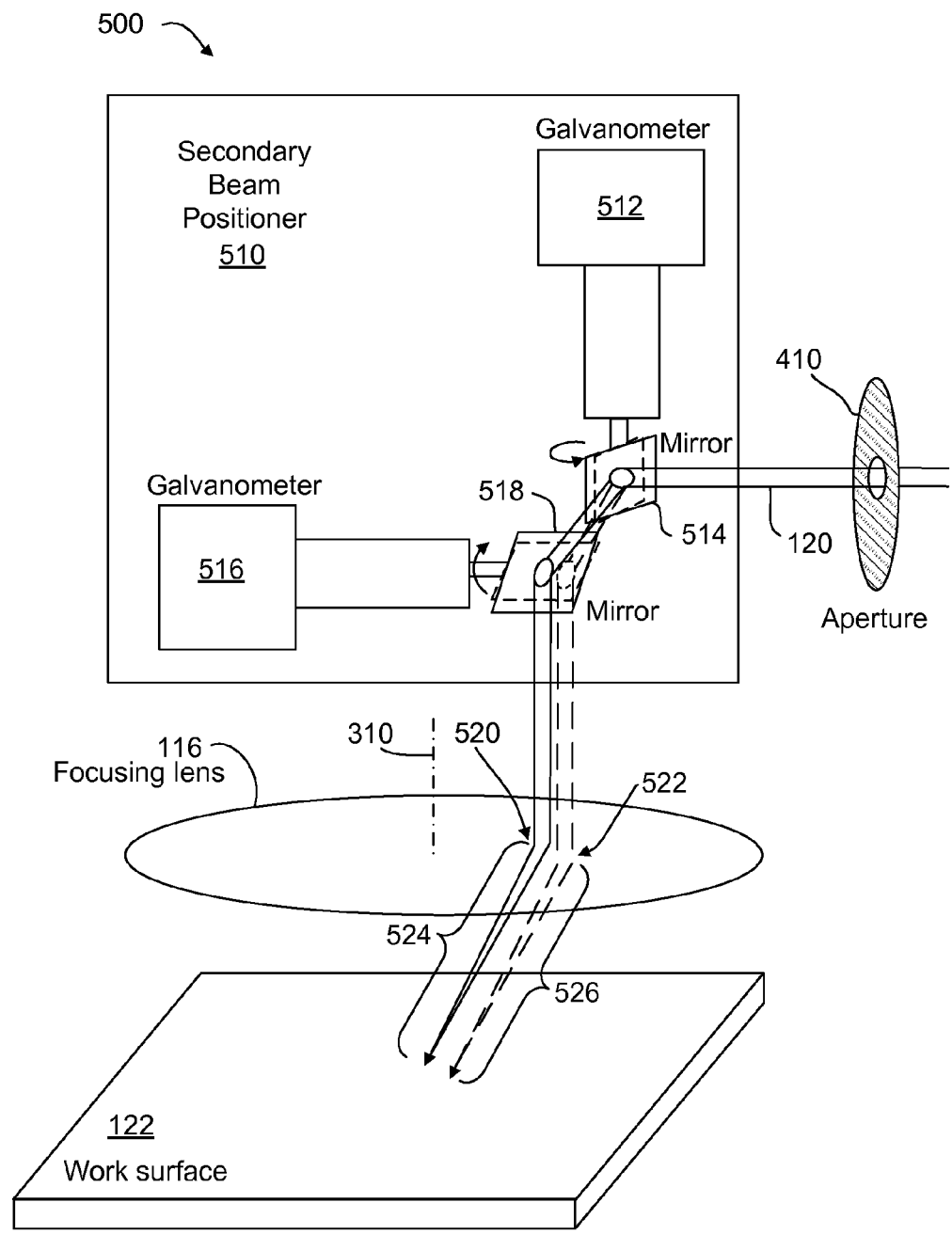
FIG. 5 is a block diagram of a laser processing system that includes a secondary beam positioner to scan the incident laser beam across the focusing lens according to one embodiment.

In addition, or in another embodiment, the focusing lens 116 and/or the beam-stop (e.g., the aperture 410 shown in FIG. 4) is combined with a secondary beam positioner that is inserted at a location between the beam-stop and the focusing lens 116. For example, FIG. 5 is a block diagram of a laser processing system 500 that includes a secondary beam positioner 510 to scan the incident laser beam 120 across the focusing lens 116 according to one embodiment. The secondary beam positioner 510 receives the collimated incident laser beam 120 (e.g., after it passes through the opening in the aperture 410) and steers the path of the incident laser beam 120 along the focusing lens 116 at an offset from the lens's primary axis 310.

In one embodiment, as shown in FIG. 5, the secondary positioning system 510 is configured to steer the incident laser beam 120 in two directions. A first galvanometer 512 adjusts a first mirror 514 to steer the incident laser beam 120 in a first direction, and a second galvanometer 516 adjusts a second mirror 518 to steer the incident laser beam 120 in a second direction. An artisan will recognize from the disclosure herein that other secondary beam positioner configurations may also be used. Although not shown in FIG. 5, the secondary beam positioner 510 may include a controller in certain embodiments comprising a processor for executing instructions stored in a computer readable medium for controlling the positions of the galvanometers 512, 516.

Figure 6A:
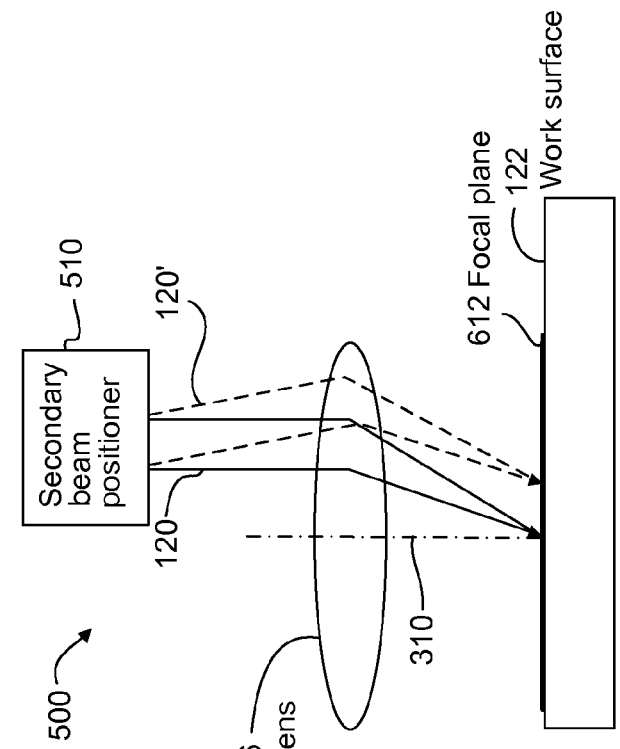
FIGS. 6A and 6B are block diagrams of respective laser processing systems that compare focal planes when using a secondary beam positioner according to certain embodiments.
Figure 6B:
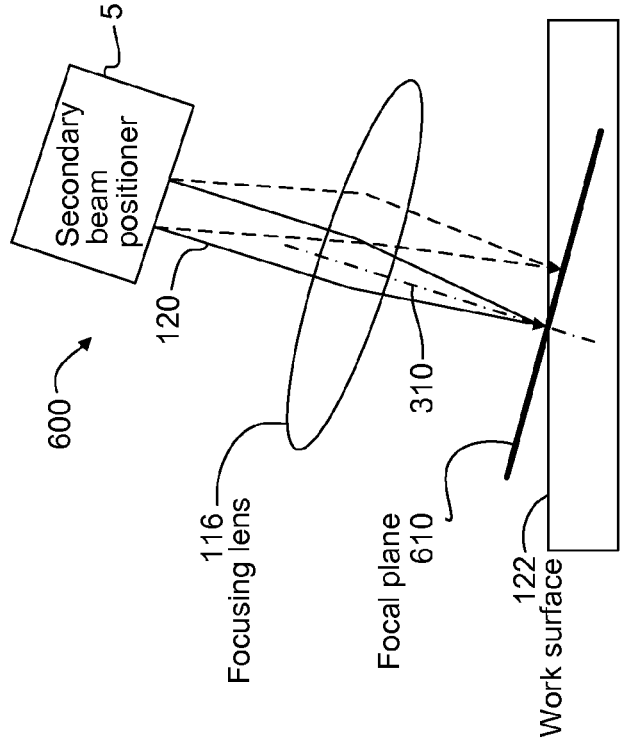

FIGS. 5, 6A, and 6B illustrate one of the advantages of the embodiments disclosed herein, as compared to the standard "tilted beam delivery assembly" approach shown in FIG. 2. Namely, in the disclosed embodiments, the beam path length from the focusing lens 116 to the point of impact on the work surface 122 remains substantially constant even as the secondary beam positioner 510 scans the incident laser beam 120 across the surface of the focusing lens 116. Referring to FIG. 5, as the secondary beam positioner 510 changes the path of the incident laser beam 120 from a first position 520 to a second position 522 with respect to the focusing lens 116, the length of the beam path 524 from the first position 520 to the work surface 122 remains substantially equal to the length of the beam path 526 from the second position 522 to the work surface 122. Note that in this example the path of the incident laser beam 120 from the first mirror 514, to the second mirror 518, through the second position 522 on the focusing lens 116, and to the work surface 122 is shown with a dashed line.

FIGS. 6A and 6B are block diagrams of respective laser processing systems that compare focal planes when using a secondary beam positioner 510 according to certain embodiments. FIG. 6A shows the beam positioner 510 used in a system 600 having a tilted beam delivery subsystem. In the embodiment shown in FIG. 6A, the primary axis 310 of the focusing lens 116 is non-perpendicular to the work surface 122. Thus, as the secondary beam positioner 510 scans the incident laser beam 120 through the primary axis 310 and other points along the focusing lens 116, the focal plane 610 shifts. The focal plane 610 shown in FIG. 6A is substantially perpendicular to the "tilted" primary axis 310 of the focusing lens 116. The ensuing variation in work surface spot size and fluence may deteriorate process performance.

This problem is reduced or avoided by the embodiments disclosed herein. For example, FIG. 6B illustrates a simplified version of the system 500 shown in FIG. 5, in which the primary axis 310 of the focusing lens 116 is substantially perpendicular to the work surface 122. Thus, as the secondary beam positioner 510 scans the incident laser beam 120 at one or more offsets along the focusing lens 116, the focal plane 612 remains substantially parallel to the work surface 122.

The embodiments discussed above are much simpler and cheaper to implement, as compared to the standard approach of inserting a polarization insensitive Faraday isolator 114 (see FIG. 1B) into the beam path. The described embodiments are also superior to the beam delivery assembly tilting approach (see FIG. 2) because they provide a constant beam path length from the focusing lens 116 to the work surface 122, even in the presence of a secondary beam positioner 510 that scans the incident laser beam 120 across the surface of the focusing lens 116.

The embodiments shown in FIGS. 3, 4, 5 and 6B may be easily implemented when the laser beam 120 is parallel to the primary axis 310 of the focusing lens 116. It may become more difficult to accurately direct the focused laser beam 120 to desired target locations on the work surface 122, however, as the secondary beam positioner 510 deflects the laser beam 120 at larger angles with respect to the primary axis 310 of the focusing lens 116, as shown by dashed lines of deflected laser beam 120' in FIG. 6B. In other words, it may be easier to implement the embodiments shown in FIGS. 3, 4, 5 and 6B for small scan fields of the focusing lens 116 than it is to implement it for relatively larger scan fields. The embodiments discussed below are more easily implemented for reducing or preventing back-reflections for relatively larger scan fields, as compared to the embodiments shown in FIGS. 3, 4, 5 and 6B.

Figure 7A:
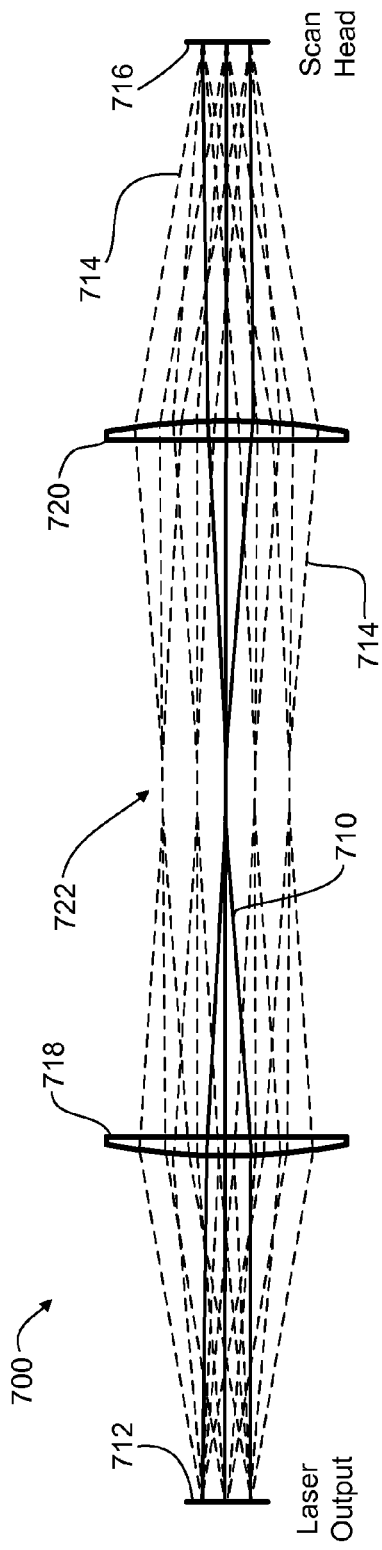
FIGS. 7A and 7B are block diagrams of laser processing systems including a Keplerian telescope to reduce or substantially prevent back-reflections according to certain embodiments.
Figure 7B:
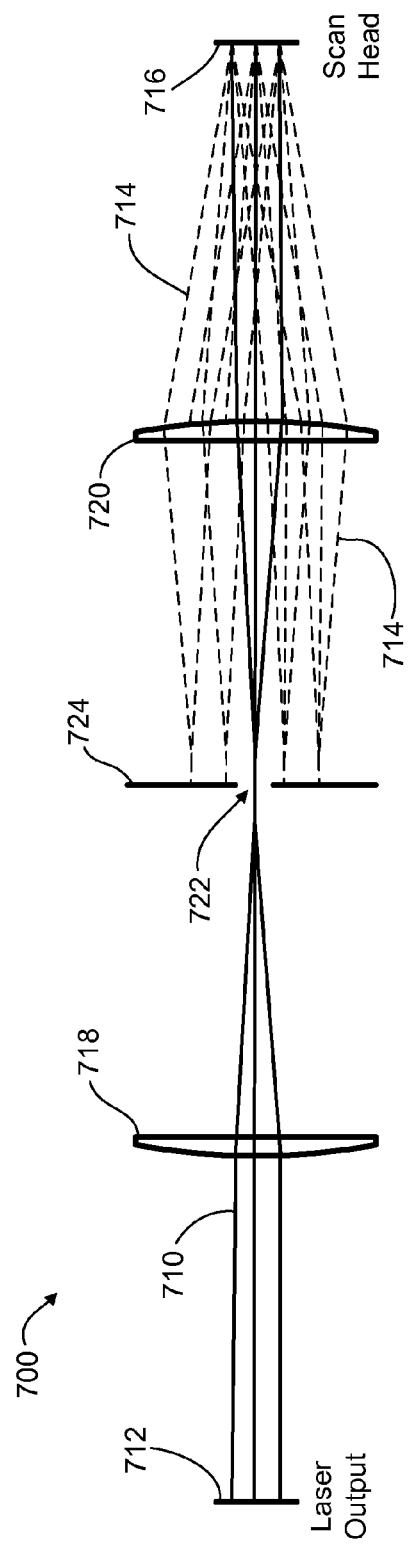

FIGS. 7A and 7B are block diagrams of laser processing systems including a Keplerian telescope 700 to reduce or substantially prevent back-reflections according to certain embodiments. For illustrative purposes in FIGS. 7A and 7B, a laser beam 710 from a laser output 712 (e.g., from the output fiber 110 and/or the collimator assembly 112 in FIG. 3) is shown with solid lines, and scatter or reflected laser beams 714 from a work surface (e.g., the work surface 122 in FIG. 3) passing back through a scan head 716 (e.g., at a higher angles) are shown as dashed lines. Although not shown, skilled persons will recognize from the disclosure herein that a portion of the reflections will also pass back directly along the axis of the laser beam 710 (e.g., at lower angles).

The Keplerian telescope 700 includes a first lens 718 and a second lens 720. The lenses 718, 720 may each comprise, for example, a singlet plano-convex lens. The first lens 718 focuses the collimated laser beam 710 received from the laser output 712 at an internal focus location 722. The second lens 720 recollimates the laser beam 710 and provides it to the scan head 716. The second lens 720 also receives the reflected laser beams 714 as it propagates back through the scan head 716 and focuses the reflected laser beams 714 at the internal focus location 722. In FIG. 7A, the reflected laser beams 714 pass back through the first lens 718 to the laser output 712. The embodiment shown in FIG. 7B, however, includes a spatial filter 724 located at the internal focus location 722 of the Keplerian telescope 700 to block a substantial portion of the (e.g., higher angle) reflected laser beams 714.

In one embodiment, the spatial filter 724 may be a pinhole aperture. In another embodiment, the spatial filter 724 may be a cone-shaped filter or other device configured to trap the higher angle reflected laser beams 714. Depending on the power level in the higher angle reflected laser beams 714, the spatial filter 724 may be water cooled in certain embodiments. The aperture diameter of the spatial filter 724 may be determined by the input diameter of the laser beam 710 (e.g., at the laser output 712) and f1 of the Keplerian telescope 700, where f1 is the focal length of the first lens 718. The reflected laser beams 714 with slight angle change due to work surface flatness and scatter due to the roughness are blocked by the spatial filter 724. For example, if the laser beam 710 from the laser output 712 is about 2 mm, and f1=f2=200 mm (where f2 is the focal length of the second lens 720), the focused beam size at the internal focus location 722 is about 160 μm. In this example, using an aperture size of about 320 μm in the spatial filter 724 blocks the reflected beams 714 with incident angles greater than about 0.05 degrees. While a relatively small amount of scatter may return to the laser output 712 through the aperture along the axis of the laser beam 710, the laser continues to function normally and without damage in many applications of this embodiment where the power of the reflected laser beam at the laser is below a threshold level for the particular laser.

In one embodiment, the scan head 716 shown in FIGS. 7A and 7B includes a telecentric lens. In other embodiments, an f-theta lens is used. When a telecentric scan lens is not required for a particular application, an f-theta lens may be used for a larger area scan and to take advantage of the telecentric angle error, which may be about 10 degrees at the edge of the field.

Figure 8:
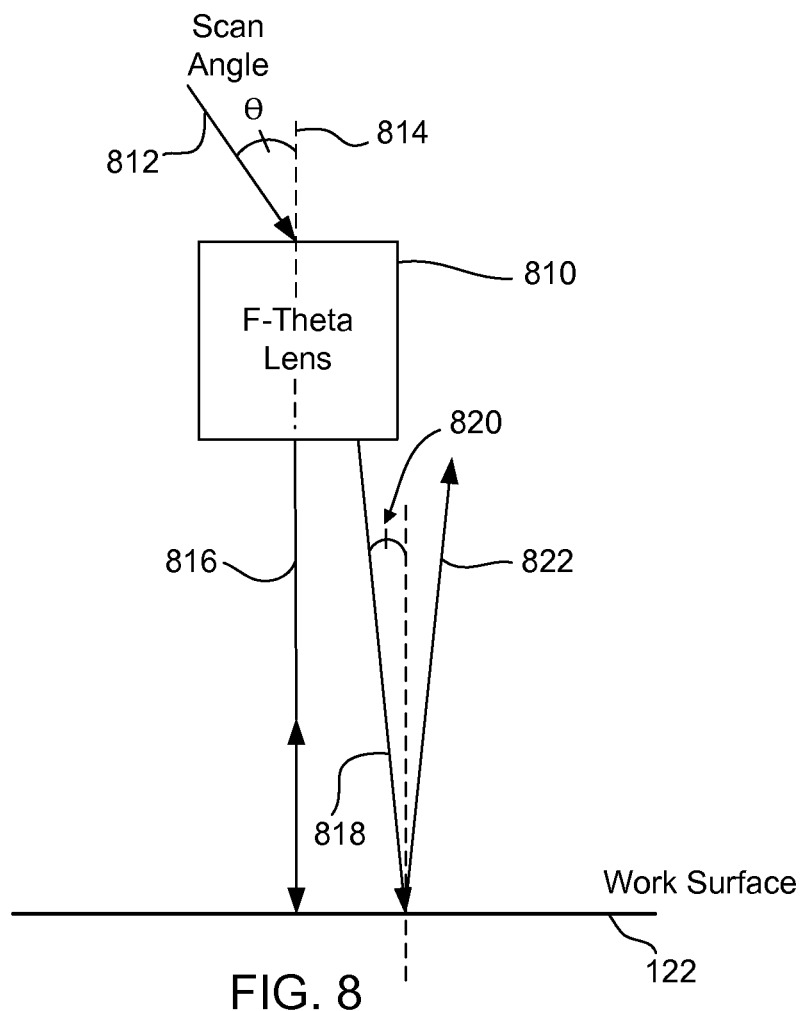
FIG. 8 is a block diagram of an f-theta lens used according to certain embodiments.

FIG. 8 is a block diagram of an f-theta lens 810 used according to certain embodiments. For illustrative purposes, an input ray 812 is shown at a scan angle θ with respect to an optical axis 814 of the f-theta lens. When the scan angle θ=0 (e.g., the input ray 812 is parallel to the optical axis 814), an output ray 816 propagates parallel to the optical axis 814 and is reflected by a work surface 122 back through the f-theta lens 810. As the scan angle θ increases, however, the laser beam exits the f-theta lens 810 at a known angle relative to the scan angle θ, as illustrated by output ray 818 that has an angle of incidence 820 with the work surface 122. In some embodiments, the angle of incidence 820 may be as high as 10 degrees to 12 degrees or higher. Thus, depending on the angle of incidence 820, a reflected ray 822 may not return through the f-theta lens 810.

Figure 9:
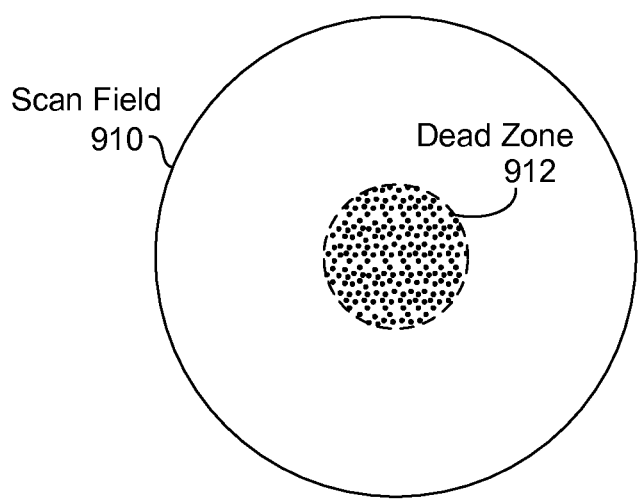
FIG. 9 schematically illustrates a scan field of the f-theta lens shown in FIG. 8 according to one embodiment.

In certain embodiments, a "dead zone" is defined in the center of the scan field of the f-theta lens 810 corresponding to an angle of incidence 820 that is close to zero. For example, FIG. 9 schematically illustrates a scan field 910 of the f-theta lens 810 shown in FIG. 8 according to one embodiment. The scan field 910 includes a predetermined portion or dead zone 912 that is not used for laser processing of targets on the work surface 122 shown in FIG. 8. In other words, because laser beam reflections from the dead zone 912 cause excessive interference with, or damage to, the laser, the scan angle θ of the laser beam into the f-theta lens 810 is controlled such that the laser beam is not incident on the work surface 122 within the dead zone 912 of the scan field 910. For example, the circular scan field 910 shown in FIG. 9 may have a diameter of about 20 mm and the dead zone 912 may have a diameter of about 5 mm to avoid excessive reflections from returning to the laser (in certain embodiments, without the need for a spatial filter).

FIGS. 10A and 10B are block diagrams of laser processing systems 1000 including a beam expander 1010 used with a spatial filter 724 to reduce or avoid back-reflections according to certain embodiments. The respective systems 1000 shown in FIGS. 10A and 10B each include a laser source 1012 to provide a collimated laser beam 1014 having a first beam diameter. The laser source 1012 may include the output fiber 110 and/or the collimator assembly 112 shown in FIG. 3. The laser beam 1014 passes through the aperture in the spatial filter 724 to the beam expander 1010. The beam expander 1010 increases the size of the laser beam 1014 from the first beam diameter to a second beam diameter. The second beam diameter may be two times (2×), three times (3×), five times (5×), or another size larger than the first beam diameter, depending on the desired spot size used for laser processing the work surface 122. The beam expander 1010 may comprise, for example, a Keplerian or Galilean beam expander. The beam expander 1010 provides a collimated laser beam 1016 having the second beam diameter to a scan head 716 for focusing the laser beam at a target location on the work surface 122. As discussed above, the scan head 716 may include a telecentric lens or an f-theta lens, such as the f-theta lens 810 shown in FIG. 8. In certain embodiments, the system 1000 may also include the secondary beam positioner 510 shown in FIG. 5 to scan the laser beam 1016 across the f-theta lens 810 at a selected scan angle θ so as to avoid the dead zone 912 of the scan field 910. In certain embodiments, the size and/or location of the dead zone 912 is based on a threshold power level of a portion of reflected light allowed to return to the laser source 1012 without interfering with its operation or causing damage thereto.

While the laser beams 1014, 1016 into and out of the beam expander 1010 are described as being collimated, each laser beam 1014, 1016 has some divergence (not shown). The beam expander 1010 changes the beam diameter, the beam divergence angle, and the pointing angle. The beam divergence angle and the pointing angle are inverse proportional to the magnification of the beam size depending upon the diameters of the input and output laser beams according to:

$$\delta(in)/\delta(out)=D(out)/D(in),$$

where δ(in) is the input beam divergence angle, δ(out) is the output beam divergence angle, D(out) is the output beam diameter, and D(in) is the input beam diameter. When the output beam diameter D(out) increases, the output beam divergence angle δ(out) decreases, and vice versa. Thus, although not shown in FIGS. 10A and 10B, the laser beam 1016 has a decreased divergence as compared to that of the laser beam 1014.

At least a portion of a reflected laser beam 1018 (shown with a dashed line) from the work surface 122 returns through the scan head 716 to the beam expander 1010. In the reverse direction, the beam expander 1010 reduces the size of the reflected laser beam 1018, e.g., from about the second diameter to about the first diameter and increases the divergence. Thus, a portion of the reflected laser beam 1020 exits the beam expander 1010 at about the first beam diameter and has a proportionally increased beam divergence angle. Although not necessarily shown to scale, the divergence of the reflected laser beam 1020 is represented in FIGS. 10A and 10B. If, for example, a 2× expander is used, the reflected laser beam 1020 will have a 2× decrease in beam diameter, a 2× increase in beam divergence angle, and a 2× increase in pointing angle as compared to those of the reflected beam 1018 entering the beam expander 1010 in the reverse direction. Accordingly, by increasing the divergence, the beam expander 1010 reduces the portion of the reflected laser beam 1020 that passes back through the aperture of the spatial filter 724.

In FIG. 10B, the system 1000 includes a Keplerian telescope 700 with the spatial filter 724 located at the internal focus location 722, as discussed above with respect to FIG. 7B. Thus, the aperture in the spatial filter 724 shown in FIG. 10B may be smaller than the aperture in the spatial filter 724 shown in FIG. 10A. Accordingly, the spatial filter 724 in FIG. 10B blocks more of the reflected laser beam 1020 than that of FIG. 10A. Further reductions in the amount of the reflected laser beam 1020 passing through the spatial filter 724 in FIGS. 10A and 10B may be made by including one or more of the other embodiments described herein (such as including within the scan head 716 the f-theta lens 810 with the predetermined dead zone 912 in the scan field 910, as discussed above with respect to FIGS. 8 and 9).

While the systems and methods described herein address back-reflection problems associated with a fiber laser based system, those skilled in the art will recognize that the approach is just as valid for systems that utilize other types of lasers as well.

It will be understood by those having skill in the art that many changes may be made to the details of the above-described embodiments without departing from the underlying principles of the invention. The scope of the present invention should, therefore, be determined only by the following claims.

The invention claimed is:

1. A method for processing a workpiece with a laser, the method comprising:
    generating, with a laser, an incident laser beam;
    determining a dead zone at a central location within a scan field of an f-theta lens, the determination based on a threshold power level of a portion of a reflected laser beam that returns to the laser;
    selecting a scan angle of the incident laser beam with respect to an optical axis of the f-theta lens; and
    propagating the incident laser beam along a beam path toward a work surface by passing the incident laser beam through the f-theta lens at the scan angle to produce an output beam incident the work surface at a target location that is not encompassed by the dead zone and at an angle of incidence that causes a reflected laser beam power level to be less than the threshold power level.

2. The method of claim 1, wherein the angle of incidence is in a range from about zero degrees to about twelve degrees.

3. The method of claim 1, wherein the angle of incidence is greater than ten degrees.

4. The method of claim 1, wherein the angle of incidence is greater than twelve degrees.

5. The method of claim 1, wherein the angle of incidence is sufficiently high such that the reflected laser beam power level is about zero power.

6. The method of claim 1, wherein the central location corresponds to a circular region of the work surface defining a potential angle of incidence that is about zero.

7. The method of claim 1, wherein the scan field has a diameter of about 20 mm.

8. The method of claim 1, wherein the dead zone has a diameter of about 5 mm.

9. The method of claim 1, further comprising controlling a secondary beam positioner to scan the incident laser beam across the f-theta lens such that the output beam is not incident the work surface within a circular region encompassed by the dead zone.

10. The method of claim 9, wherein the secondary beam positioner comprises a pair of galvanometer-driven mirrors.

\* \* \* \* \*